United States Patent Office.

JOSEPH TATTERSALL, OF INDIANAPOLIS, INDIANA.

*Letters Patent No. 64,594, dated May 7, 1867.*

IMPROVED COMPOUND FOR MAKING ARTIFICIAL STONE AND FOR COATING STONE, BRICKS, &c.

*The Schedule referred to in these Letters Patent and making part of the same.*

TO ALL WHOM IT MAY CONCERN:

Be it known that I, JOSEPH TATTERSALL, of Indianapolis, in the county of Marion, and State of Indiana, have invented a new and useful compound called "Terasso."

With this compound I can imitate many kinds of stone, and can use it for the purpose of producing artificial stone for building purposes; for covering all kinds of surfaces with a thin layer or layers, giving such surface the appearance of being made of stone; for covering roofs, making them both fire and water-proof, and for any other purpose for which cement, mastic, or artificial stone can be used.

This compound, when perfectly dry, is as hard as natural stone or rock, is water and fire-proof, and durable. Its cheapness brings it within the reach of any one. It is composed of forty-eight parts of river or lake sand, or any pulverized stone, or other silicious matter; one part of litharge; one part of bone ashes, and one part of air-slaked lime, all of which must be mixed together with such proportion of boiled linseed oil as to make a mass which can be easily applied and will adhere to stone, brick, wood, iron, &c. To make better qualities of this compound I add to the oil a sufficient quantity of white lead to give it a creamy appearance, together with from one-quarter to one-half ounce of caoutchouc to each gallon of oil. For the purpose of increasing the consistency of the compound, absorbing the moisture, and producing finer imitations, I add to it pulverized earthenware in various proportions, but generally six parts. I can also, by using different pigments, change the color at pleasure.

In coating surfaces this compound is applied like plaster or mortar, varying the thickness of the layers according to the purposes for which it may be used. In applying the compound to absorbent surfaces a preparation of linseed oil and litharge is first applied. If it is wished to produce masses of artificial stone, either plain or ornamental, the compound is pressed into moulds and taken out after it is hardened sufficient to retain the form of the mould, but before it can adhere to the mould. The mass must be allowed to become hard before it is used.

What I claim, and desire to secure by Letters Patent of the United States, is—

The compound herein described, together with such variations as may be produced by varying the proportions of the ingredients named, substantially as and for the purposes set forth and described.

JOSEPH TATTERSALL.

Witnesses:
JNO. L. SMITHMYER,
H. R. HUEBNER.